US012612127B2

(12) United States Patent (10) Patent No.: US 12,612,127 B2
Yamamoto et al. (45) Date of Patent: Apr. 28, 2026

(54) TURN SIGNAL SWITCH

(71) Applicant: TOYO DENSO KABUSHIKI KAISHA, Tokyo (JP)

(72) Inventors: Kazuyoshi Yamamoto, Saitama (JP); Kazuki Nagata, Saitama (JP)

(73) Assignee: TOYO DENSO KABUSHIKI KAISHA, Tokyo (JP)

(*) Notice: Subject to any disclaimer, the term of this patent is extended or adjusted under 35 U.S.C. 154(b) by 565 days.

(21) Appl. No.: 18/125,871

(22) Filed: Mar. 24, 2023

(65) Prior Publication Data

US 2023/0312035 A1 Oct. 5, 2023

(30) Foreign Application Priority Data

Mar. 31, 2022 (JP) ................................. 2022-058117

(51) Int. Cl.
 *B62J 6/056* (2020.01)
 *B60Q 1/40* (2006.01)
 (Continued)

(52) U.S. Cl.
 CPC ................ *B62J 6/056* (2020.02); *B60Q 1/40* (2013.01); *B62J 6/16* (2013.01); *H01H 21/22* (2013.01); *H01H 25/008* (2013.01)

(58) Field of Classification Search
 None
 See application file for complete search history.

(56) References Cited

U.S. PATENT DOCUMENTS 5,272,290 A * 12/1993 Suzuki ................. B60Q 1/1476
                                                          200/61.54
5,804,784 A * 9/1998 Uchiyama ............ B60Q 1/1469
                                                          200/61.54
(Continued)

FOREIGN PATENT DOCUMENTS

JP        H10-50178 A      2/1998
JP        H10-241503 A     9/1998
          (Continued)

OTHER PUBLICATIONS

Japanese Office Action mailed by Japanese Patent Office dated on Dec. 18, 2025 in corresponding Japanese patent application No. 2022-058117.

*Primary Examiner* — Felix O Figueroa
(74) *Attorney, Agent, or Firm* — IP Business Solutions, LLC

(57) ABSTRACT

A turn signal switch according to the present invention includes: an operation lever that can be operated to swing along a first operation direction, operated in a pushing operation direction, and operated in a second operation direction that is linear and different from both the first operation direction and the pushing operation direction; and a contact part that switches between a conduction state and a non-conduction state in accordance with the operation. The operation lever is configured to, after one end of the operation lever is operated to swing along the first operation direction or operated in the pushing operation direction, be returned to a neutral position at which the operation lever is held when not operated and, when the one end of the operation lever is operated in the second operation direction, be held at a position at time of the operation.

4 Claims, 7 Drawing Sheets

(51) Int. Cl.
    *B62J 6/16*        (2020.01)
    *H01H 21/22*     (2006.01)
    *H01H 25/00*     (2006.01)

(56)         References Cited

U.S. PATENT DOCUMENTS

| | | | | |
|---|---|---|---|---|
| 5,900,601 | A * | 5/1999 | Uchiyama | B60Q 1/1476 |
| | | | | 200/61.54 |
| 6,069,329 | A * | 5/2000 | Weiss | B60Q 1/1469 |
| | | | | 200/61.27 |
| 6,172,311 | B1 * | 1/2001 | Hayashi | B60Q 1/1469 |
| | | | | 200/61.54 |
| 6,300,852 | B1 * | 10/2001 | Kato | B60Q 1/40 |
| | | | | 200/61.54 |
| 6,326,566 | B1 * | 12/2001 | Weiss | B60Q 1/0082 |
| | | | | 200/6 R |
| 7,385,152 | B2 * | 6/2008 | Hasch | H01H 3/60 |
| | | | | 200/61.54 |
| 10,800,324 | B2 * | 10/2020 | Takayama | H01H 21/04 |

FOREIGN PATENT DOCUMENTS

| | | | |
|---|---|---|---|
| JP | 2003-25908 | A | 1/2003 |
| JP | 4282357 | B2 | 6/2009 |
| JP | 2011-233457 | A | 11/2011 |

* cited by examiner

20ab　　20aa

20a

TURN SIGNAL SWITCH

INCORPORATION BY REFERENCE

This application is based upon and claims the benefit of priority from Japanese patent application No. 2022-058117, filed on Mar. 31, 2022, the disclosure of which is incorporated herein in its entirety by reference.

TECHNICAL FIELD

The present invention relates to a turn signal switch.

BACKGROUND ART

A vehicle having a handlebar, such as a motorcycle, is equipped with a turn signal switch for operating turn signals near the grip of the handlebar. The turn signal switch can be operated to swing side to side and, when the turn signal switch is operated, a turn signal in the operated direction blinks.

Further, the turn signals function as hazard lights when both the left and right turn signals blink simultaneously, and the vehicle is also equipped with a switch for operating the hazard lights. In some cases, the turn signal switch has a function for operating the hazard lights as described in Patent Document 1. Specifically, in Patent Document 1, an operation knob is first operated to swing side to side to cause one of the turn signals to blink, and the operation knob is thereafter pushed to cancel the blinking of the turn signal. In addition to this, the operation knob is operated to swing leftward in the pushed state and locked to cause the turn signals to blink as the hazard lights.

Patent Document 1: Japanese Patent Publication No. 4282357

However, the configuration disclosed in Patent Document 1 described above has a problem that operability in performing the turn signal operation and the hazard light operation cannot be improved. That is to say, according to Patent Document 1, the operation knob is operated to swing leftward in the pushed state for performing the hazard light operation, so that it is difficult to operate instantly.

SUMMARY OF THE INVENTION

Accordingly, an object of the present invention is to solve the abovementioned problem that operability in the turn signal operation and the hazard light operation using a single operation lever cannot be improved.

A turn signal switch as an aspect of the present invention includes: an operation lever that can be operated to swing along a first operation direction, operated in a pushing operation direction, and operated in a second operation direction that is linear and different from both the first operation direction and the pushing operation direction; and a contact part that switches between a conduction state and a non-conduction state in accordance with whether the operation lever is operated to swing along the first operation direction, operated in the pushing operation direction, or operated in the second operation direction. The operation lever is configured to, after one end of the operation lever is operated to swing along the first operation direction or operated in the pushing operation direction, be returned to a neutral position at which the operation lever is held when not operated and, when the one end of the operation lever is operated in the second operation direction, be held at a position at time of the operation.

With the configuration as described above, the present invention can improve operability in the turn signal operation and the hazard light operation using a single operation lever.

EXAMPLE EMBODIMENT

First Example Embodiment

A first example embodiment of the present invention will be described with reference to FIGS. 1 to 4.

[Configuration]

A turn signal switch according to the present invention is for operating a turn signal, mounted on a handlebar of a motorcycle or the like. Furthermore, the turn signal switch according to the present invention is configured to be able to perform a hazard light operation.

Figure 1:
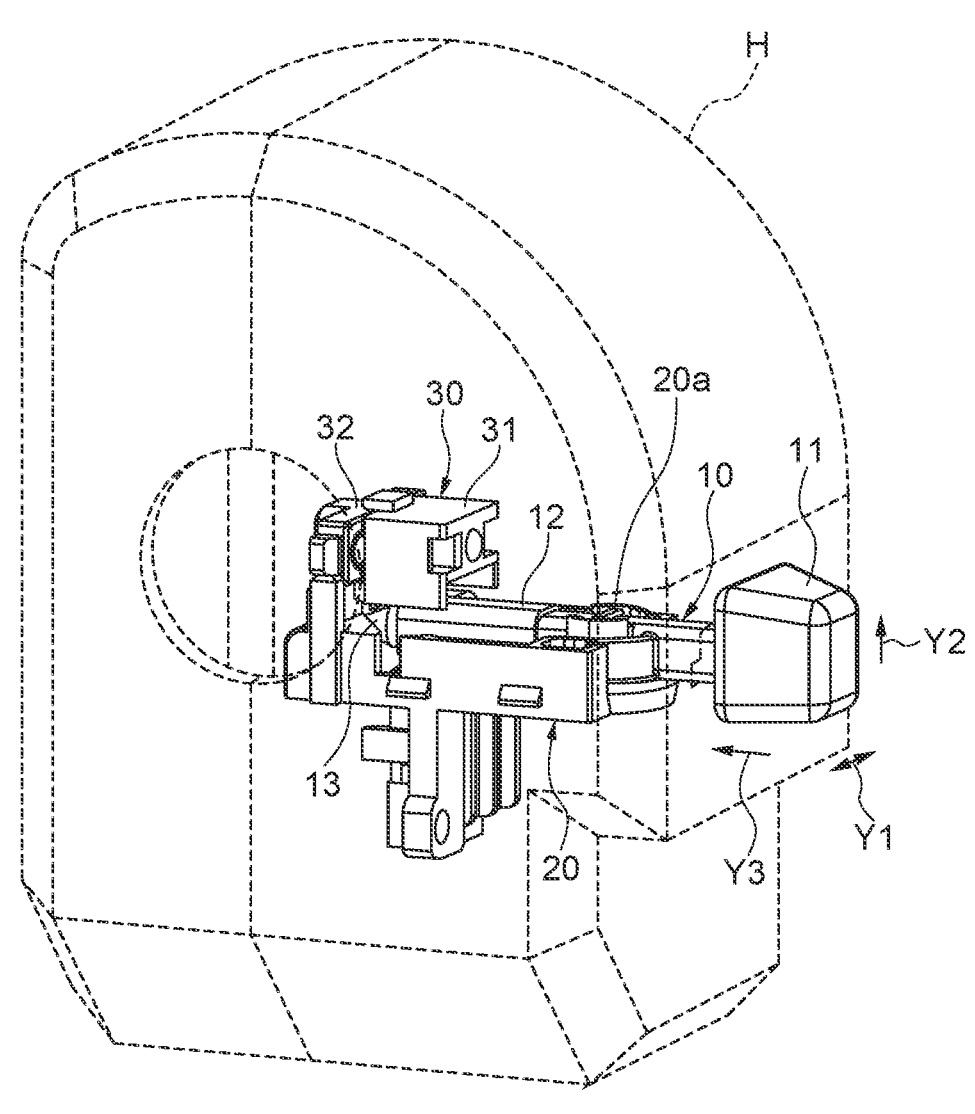
FIG. 1 is a figure showing a configuration of a turn signal switch in a first example embodiment of the present invention.
Figure 2A:
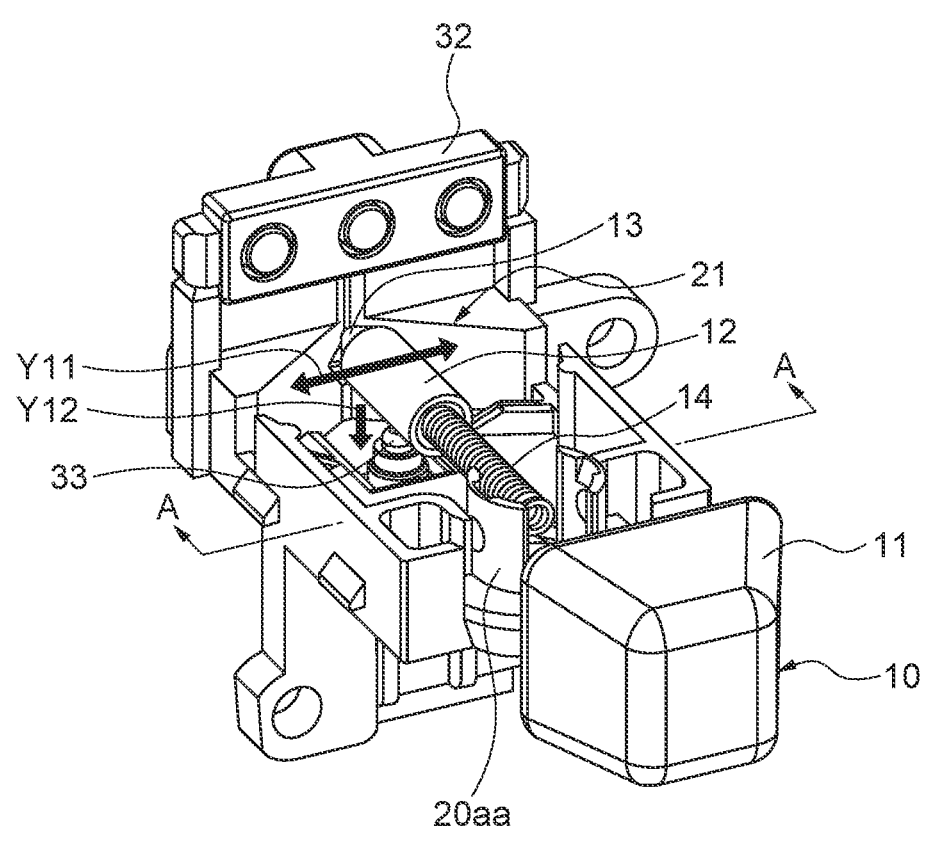
FIG. 2A is a figure showing a configuration of part of the turn signal switch disclosed in FIG. 1.
Figure 3:
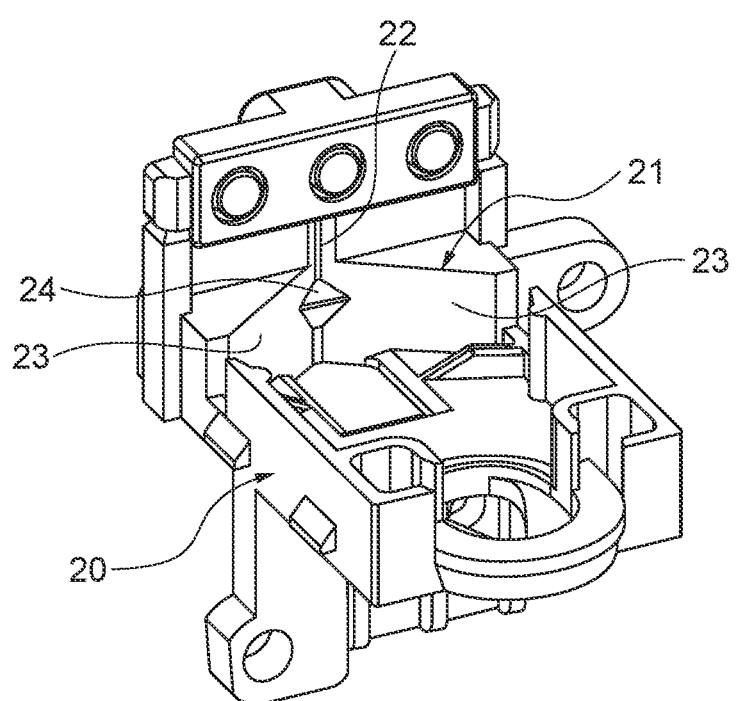
FIG. 3 is a figure showing a configuration of part of the turn signal switch disclosed in FIG. 1.
Figure 4:
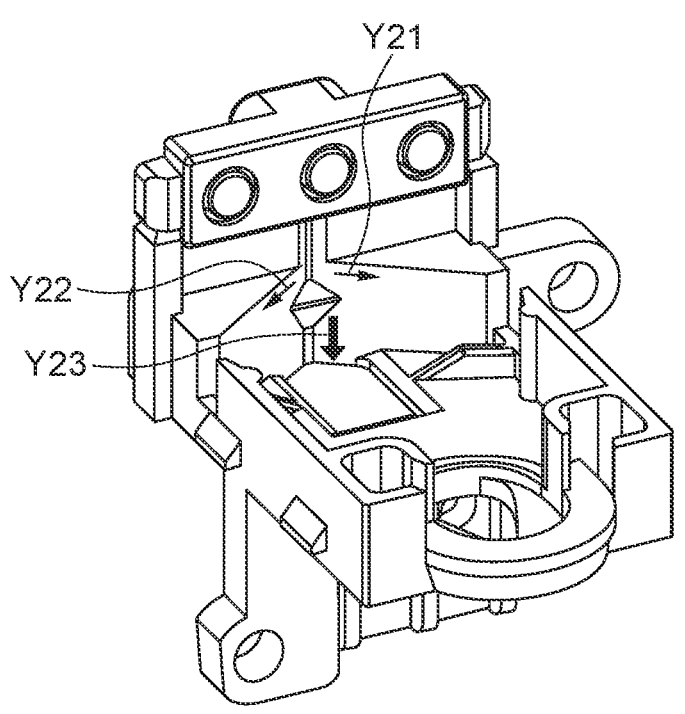
FIG. 4 is a figure showing a configuration of part of the turn signal switch disclosed in FIG. 1.

FIG. 1 shows an internal configuration of the turn signal switch with a case and the like removed. As shown in FIG. 1, the turn signal switch includes an operation lever 10, a support mechanism 20 that supports the operation lever 10 in a movable manner, and a contact mechanism in which a conduction state switches in response to operation of the operation lever 10. The respective components will be described in detail below. The turn signal switch is mounted on the handlebar while being housed in a housing H indicated by dashed line in FIGS. 1, 2A, 3, and 4 are upper perspective views of the turn signal switch shown in FIG. 1, excluding part of the configuration. Specifically, FIG. 2A is a view of the operation lever 10 of the turn signal switch with part of the configuration removed, and FIG. 2 is a cross-section diagram taken along line A-A when the configuration of the operation lever 10 is not omitted. FIGS. 3 and 4 are views with the operation lever 10 of the turn signal switch removed further.

As shown in FIG. 1, the operation lever 10 includes a knob 11 which is a part operated by an operator, a lever part 12 having a predetermined length, extending from the knob 11, and a sliding pin 13 provided at the tip of the lever part 12.

The knob 11 is formed in a substantially rectangular parallelepiped shape, and is a part operated by the operator with the thumb. The knob 11 can be operated to swing in a first operation direction Y1, which is a substantially horizontal direction and is a side-to-side direction as seen from the operator, from a neutral position where the knob 11 is located when not operated. Moreover, the knob 11 can be operated in a second operation direction Y2, which is substantially vertical direction and is an upward direction as seen from the operator, from the neutral position where the knob 11 is located when not operated. Furthermore, the knob 11 can be operated in a pushing operation direction Y3, which is a direction of pushing the knob 11 to move in a longitudinal direction of the lever part 12 and is a forward direction as seen from the operator, from the neutral position where the knob 11 is located when not operated. The second operation direction Y2 is a direction which is different from both the first operation direction Y1 and the pushing operation direction Y3 as described above, and is a linear operation direction.

The lever part 12 is formed of a rod-like body having a predetermined length. The knob 11 is connected to one end in the longitudinal direction of the lever part 12, and the sliding pin 13 is connected to the other end, which is the tip of the lever part 12. The lever part 12 is configured by connecting a one-end-side part to which the knob 11 is connected and an other-end-side part to which the sliding pin 13 is connected. The lever part 12 is pivotally supported by a shaft member 20a provided on the support mechanism 20 at a predetermined position along the longitudinal direction.

Figure 2B:
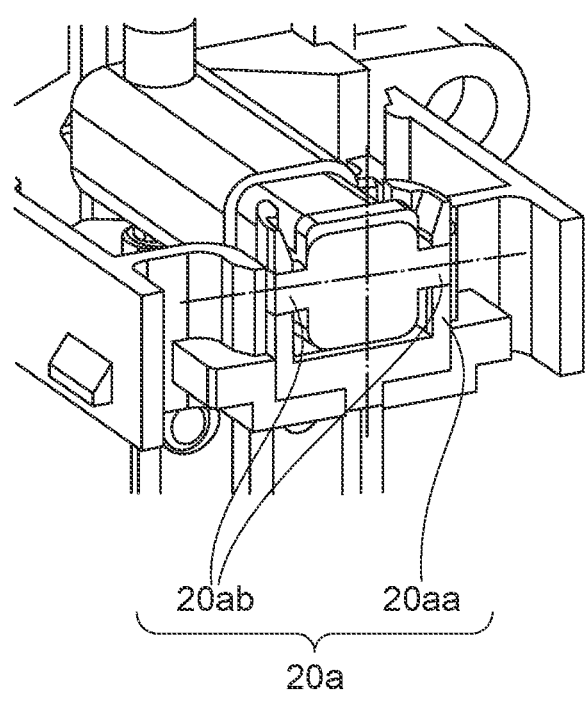
FIG. 2B is a cross-section diagram taken along line A-A of the turn signal switch disclosed in FIG. 2.

For describing the shaft member 20a shown in FIG. 2A in detail, a sectional perspective view taken along line A-A of the lever part 12 and the shaft member 20a is shown in FIG. 2B. As shown in FIG. 2B, the shaft member 20a has a first shaft part 20aa having a rotation axis of the lever part 12 along the second direction, and a second shaft part 20ab having a rotation axis of the lever part 12 along the first direction. The first shaft part 20aa is a cylindrical member set up in the second direction, and the lever part 12 is inserted in the pushing direction. Consequently, the lever part 12 is pivotally supported so as to be rotatable in the substantially horizontal direction with the first shaft part 20aa as a fulcrum. The second shaft part 20ab is a rod-like member that protrudes in the first direction from the lever part 12, and is fitted to the first shaft part 20aa. Consequently, the lever part 12 is pivotally supported so as to be rotatable in the substantially vertical direction with the second shaft part 20ab as a fulcrum. The lever part 12 may be pivotally supported so as to be rotatable in any direction, that is, in 360-degree directions. The shaft member 20a having the first shaft part 20aa and the second shaft part 20ab can suppress rattling of the lever part 12, and downsizing of the device can be achieved by concentrating the shafts for multi-directional operation in one place.

Since the lever part 12 is pivotally supported by the shaft member 20a as described above, when the knob 11 is operated to swing in the first operation direction Y1 along the substantially horizontal direction, the lever part 12 rotates by a predetermined angle in the substantially horizontal direction with the first shaft part 20aa as a fulcrum, and the sliding pin 13 connected to the tip thereof swings along the first operation direction that is the substantially horizontal direction as indicated by arrow Y11 in FIG. 2A. Moreover, when the knob 11 is operated to move in the second operation direction Y2 that is the upward direction along the substantially vertical direction as described above, the lever part 12 rotates by a predetermined angle in the substantially vertical direction with the second shaft part 20ab as a fulcrum, and the sliding pin 13 connected to the tip thereof moves in a downward direction that is opposite to the upward operation direction, as indicated by arrow Y12 in FIG. 2A.

Further, as shown in FIG. 2A, a biasing member 14 that applies a pressing force to the sliding pin 13 is provided inside the lever part 12. The biasing member 14 is formed of, for example, a compression coil spring, and is configured to press the sliding pin 13 toward the tip at all times. In addition, the biasing member 14 also biases the knob 11 of the lever part 12 toward the knob 11. Therefore, when the knob 11 is operated in the pushing operation direction Y3 from the neutral position where the knob 11 is located when not operated as described above, the one-end-side part with the knob 11 connected of the lever part 12 moves toward the other end, but the knob 11 is pushed back toward the one end by the biasing member 14 and returned to the neutral position.

Further, as shown in FIG. 2A, the sliding pin 13 (sliding member) provided at the tip that is the other end of the lever part 12 is formed with a pointed tip. The sliding pin 13 is configured to abut against a wall to slide on 21 that is formed on the support mechanism 20 so as to face the tip of the sliding pin 13, and slide on the wall surface of the wall to slide on 21.

As shown in FIGS. 2A and 3, the wall to slide on 21 (member to slide on) is located on the other end side in the longitudinal direction of the operation lever 10 in the support mechanism 20, and is formed of a wall surface set up along the substantially vertical direction. Specifically, the wall to slide on 21 is formed by a valley part 22 against which the sliding pin 13 abuts as shown in FIGS. 2A and 3 when the operation lever 10 is in the neutral position, and inclined surfaces 23 located on both the sides in the first operation direction Y1 with the valley part 22 as a boundary. The valley part 22 is located almost in the middle of the wall to slide on 21 in the substantially horizontal direction that is the first operation direction Y1, and is formed in a linear valley shape along the substantially vertical direction that is the second operation direction Y2. The inclined surfaces 23 are formed extending to one side and the other side in the substantially horizontal direction that is the first operation direction Y1, respectively, with the valley part 22 as a boundary, and are formed in a V shape so that the valley part 22 becomes the valley bottom. The inclined surfaces 23 are each formed so that a height thereof from the valley part 22 gradually increases with increasing distance from the valley part 22 along the first operation direction Y1. Therefore, the inclined surfaces 23 are set up so that the two wall surfaces sandwich the tip of the operation lever 10 from the sides, and are formed to be connected at the valley part 22 while the distance between the two wall surfaces gradually decreases with decreasing distance to the tip of the operation lever 10, that is, to the neutral position where the sliding pin 13 is located when not operated.

Further, the surface of the inclined surface 23 is formed so that frictional force against the sliding of the sliding pin 13 becomes small in order that the sliding pin 13 can slide. Therefore, when the knob 11 is operated to swing in the first operation direction Y1 as described above, the sliding pin 13 slides along the first operation direction Y1 on the one-side inclined surface 23 as indicated by arrow Y21 in FIG. 4 or on the other-side inclined surface 23 as indicated by arrow Y22 in FIG. 4 with the valley part 22 as a boundary. After the knob 11 is operated to swing in the first operation direction Y1, the sliding pin 13 moves toward the valley part 22 along the slope of the inclined surface 23 and returns to the neutral position since the sliding pin 13 is pressed toward the tip as described above.

Further, as shown in FIGS. 2A and 3, a convex part 24 protruding toward the operation lever 10 from the wall surface is formed on the valley part 22 of the wall to slide on 21. Specifically, as shown in FIGS. 2A and 3, the convex part 24 is formed below the sliding pin 13 of the operation lever 10 located in the neutral position, in the second operation direction Y2, that is, the substantially vertical direction of the valley part 22. That is to say, the convex part 24 is formed at a position on the valley 22 and on the opposite side (lower side) to the second operation direction Y2 (upper side) with respect to the sliding pin 13 located in the neutral position. Then, the convex part 24 is formed to be inclined so that a height thereof from the valley part 22 gradually increases with increasing distance from the sliding pin 13 in the opposite direction to the second operation direction Y2, that is, in the downward direction. Then, the convex part 24 is formed to be inclined so that the middle in the second operation direction Y2 of the convex part 24 is the apex thereof and the height gradually decreases toward the valley part 22 with increasing distance from the apex downward.

Further, the convex 24 is formed to have a predetermined width in the first operation direction Y1, that is, the substantially horizontal direction. For example, the convex part 24 is formed so that the width thereof becomes narrower than the width of the wall to slide on 21 along the first operation direction, that is, the distance between the two inclined surfaces 23 forming a substantially V shape. Besides, the convex part 24 is formed so that the width thereof becomes narrower than a width when the operation lever 10 is operated to swing at the maximum along the first operation direction Y1. In other words, when the operation lever 10 is operated to swing at the maximum in the first operation direction Y1 and the sliding pin 13 slides and moves by a maximum distance on the one-side or other-side inclined surface 23, the sliding pin 13 is located outside the convex part 24 in the first operation direction Y1.

When the knob 11 of the operation lever 10 is operated in the upper direction that is the second operation direction Y2 as described above, the sliding pin 13 moves from a position above the convex part 24 that is the neutral position of the valley part 22 to a position below the convex part 24 over the convex part 24 as indicated by arrow Y23 of FIG. 4. Specifically, the sliding pin 13 first slides so as to ascend an upper-side slope of the convex part 24, climes over the apex, and slides so as to descend a lower-side slope of the convex part 24. Then, after the knob 11 is operated in the second operation direction Y2, the sliding pin 13 remains at the position below the convex part 24 that is the position in operation, and is held at the position.

The contact mechanism 30 (contact part) includes turn signal contact mechanisms 31 and 32 that detect turn signal operation corresponding to operation of the operation lever 10, as shown in FIGS. 1 and 2A. The turn signal contact mechanisms 31 and 32 are provided above the tip of the operation lever 10, and include a moving part 31 that moves the contact in accordance with the movement of the sliding pin 13 by the swing operation in the first operation direction Y1, and a detection part 32 that detects the conduction and non-conduction states of the contact, that is, the on and off states of the turn signal operation in accordance with the movement of the moving part 31. For example, when the sliding pin 13 of the operation lever 10 is moved to one side (for example, right side as seen from the operator) with respect to the valley part 22 of the wall to slide on 21, the moving part 31 moves the contact in the same direction as the sliding pin 13 is moved, and the detection part 32 detects operation of one of the turn signals corresponding to the movement of the contact to the one side (right side). Likewise, when the sliding pin 13 of the operation lever 10 is moved to the other side (for example, left side as seen from the operator) with respect to the valley part 22 of the wall to slide on 21, the moving part 31 moves the contact in the same direction as the sliding pin 13 is moved, and the detection part 32 detects operation of the other turn signal corresponding to the movement of the contact to the other side (left side). Consequently, either one turn signal or the other turn signal blinks. Moreover, when the operation lever 10 is operated in the pushing operation direction Y3, the moving part 31 moves the contact so that the contact comes into the non-conduction state, and the detection part 32 detects an operation to stop the blinking of the turn signal. Consequently, the blinking of the turn signal is stopped.

Further, the contact mechanism 30 includes a hazard light contact mechanism 33 that detects a hazard light operation corresponding to operation of the operation lever 10. As shown in FIG. 2A, the hazard light contact mechanism 33 is provided below the tip of the operation lever 10, and moves the contact in accordance with the movement of the sliding pin 13 by operation in the second operation direction Y2 to detect the conduction and non-conduction states of the contact, that is, the on and off states of the hazard light operation. For example, when the sliding pin 13 of the operation lever 10 is moved downward along the valley part 22 of the wall to slide on 21, the hazard light contact mechanism 33 is pressed from above by the tip-side part of the operation lever 10, and detects operation to make the hazard lights blink. On the other hand, when the sliding pin 13 of the operation lever 10 is moved to the neutral position from the downwardly moved state, the hazard light contact mechanism 33 detects operation to stop the blinking of the hazard lights because the press from above is canceled.

The hazard light contact mechanism 33 described above is configured as a second biasing member that, when pressed by the operation lever 10 from above as described above, applies force to make the operation lever 10 move in the second operation direction Y2, that is, upward. For example, by providing a compression coil spring inside the hazard light contact mechanism 33, the hazard light contact mechanism 33 is configured to apply upwardly pressing force to a part on the side of the sliding pin 13 of the operation lever 10 moved downward. Meanwhile, the tip-side part of the operation lever 10 may be biased so as to be pressed in the second operation direction Y2 by another configuration.

[Operation]

Next, an operation of the turn signal switch will be described. First, a case where an operator performs turn signal operation will be described. The operator operates the knob 11 of the operation lever 10 that is in the unoperated state and located in the neutral position, as indicated by arrow Y1 in FIG. 1, in the first operation direction Y1, that is, in the leftward or rightward direction as seen from the operator. Then, the operation lever 10 rotates along the substantially horizontal plane with the first shaft part 20aa as a fulcrum, and the sliding pin 13 at the tip thereof moves rightward or leftward as indicated by arrow Y11 in FIG. 2A and arrows Y21 and Y22 in FIG. 4. Then, in accordance with the movement of the tip of the operation lever 10, the turn signal contact mechanisms 31 and 32 detect turn signal operation in the leftward or rightward direction of the knob 11, and make either turn signal of the corresponding direction blink.

At the time, the sliding pin 13 of the operation lever 10 slides on the inclined surface 23 so as to leave rightward or leftward as seen from the operator from the valley part 22 of the wall to slide on 21. After the operator cancels the operation, the sliding pin 13, which is pressed toward the tip, moves so as to return to the neutral position along the slope of the inclined surface 23. Therefore, the operation lever 10 returns to the neutral position in a state that the turn signal of the either direction is blinking.

After that, for stopping the blinking of the turn signal, the operator operates the knob 11 located in the neutral position in the pushing operation direction Y3 as indicated by arrow Y3 in FIG. 1. Then, the one-end-side part with the knob 11 connected of the operation lever 10 moves toward the other end. In accordance with this, the turn signal contact mechanisms 31 and 32 detect an operation to stop the blinking of the turn signal, and the blinking of the turn signal is stopped. After that, the knob 11 of the operation lever 10 is pushed back toward the one end, and returns to the neutral position.

Next, a case where the operator performs hazard light operation will be described. The operator operates the knob 11 of the operation lever 10 that is in the unoperated state and located in the neutral position, as indicated by arrow Y2 in FIG. 1, in the second operation direction Y2, that is, in the upward direction as seen from the operator. Then, the operation lever 10 rotates along a plane perpendicular to the substantially horizontal plane with the second shaft part 20*ab* as a fulcrum, and the sliding pin 13 at the tip thereof moves downward as indicated by arrow Y12 in FIG. 2A and arrow Y23 in FIG. 4. At the time, the sliding pin 13 moves from a position above the convex part 24 that is the neutral position of the valley part 22 to a position below the convex part 24 over the convex part 24 as indicated by arrow Y23 in FIG. 4. In accordance with this, the hazard light contact mechanism 33 detects hazard light operation by being pushed from above with the tip-side part of the operation lever 10, and the hazard lights are made to blink. Then, after the operator operates the knob 11 in the second operation direction Y2, the sliding pin 13 remains at the position below the convex part 24, which is the position in operation, to be held at the position, and the blinking of the hazard lights is kept.

After that, for stopping the blinking of the hazard lights, the operator operates the knob of the operation lever 10 with the sliding pin 13 of the tip being held at the position below the convex part 24, in the second operation direction Y2, that is, in the downward direction as seen from the operator. Then, the sliding pin 13 moves from the position below the convex part 24 to the position above the convex part 24, and returns to the neutral position. Consequently, the hazard light contact mechanism 33 detects an operation to stop the hazard lights because the press from above by the tip-side part of the operation lever 10 is canceled, and the blinking of the hazard lights is stopped. This is the basic operation to stop the blinking of the hazard lights.

Further, another operation to stop the blinking of the hazard lights is operating the knob of the operation lever 10 with the sliding pin 13 of the tip being held at the position below the convex part 24 to move in the first operation direction Y1, that is, in the leftward or rightward direction as seen from the operator. In this case, first, the position of the sliding pin 13 shifts from the position below the convex part 24 in the substantially horizontal direction. Since the tip-side part of the operation lever 10 is biased so as to be pressed upward by the hazard light contact mechanism 33, the sliding pin 13 slides on the inclined surface 23 located beside the convex part 24 and moves upward. Furthermore, since the sliding pin 13 is pressed toward the tip, the sliding pin 13 moves further upward from beside the convex part 24, and then moves so as to return to the neutral position above the convex part 24 along the slope of the inclined surface 23. Then, as in the basic operation, the hazard light contact mechanism 33 detects the operation to stop the hazard lights because the press from above by the tip-side part of the operation lever 10 is canceled, and the blinking of the hazard lights is stopped.

As described above, the turn signal switch in this example embodiment enables the operator to perform operation in the substantially horizontal direction, that is, in the side-to-side direction on the operation lever 10 located in the neutral position to perform turn signal operation, and also perform operation in the substantially vertical direction, that is, in the upward direction on the operation lever 10 located in the neutral position to perform hazard light operation. In particular, at the time of the hazard light operation, the operation lever 10 is held at the position after the operation, and the blinking of the hazard lights is continued. Thus, with a single turn signal switch, it is possible to perform the hazard light operation as well by simple operation and improve the operability.

MODIFIED EXAMPLE

Next, a modified example of the turn signal switch described above will be described with reference to FIG. 5. The turn signal switch in the modified example has almost the same configuration as the turn signal switch described above, but is different in the configuration of the wall to slide on 21 (member to slid on) on which the sliding pin 13 slides. Below, the configuration different from the above will be mainly described.

Figure 5:
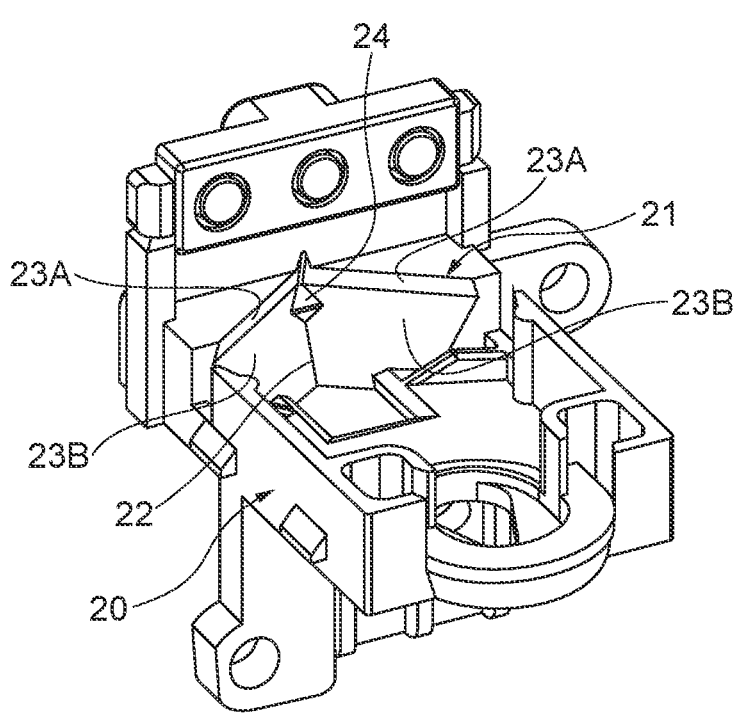
FIG. 5 is a figure showing another example of the configuration of part of the turn signal switch disclosed in FIG. 1.

As shown in FIG. 5, the wall to slide on 21 in the modified example has, in the same manner as described above, inclined surfaces formed along the first operation direction Y1, that is, formed separately on the left and right side as seen from the operator with the valley part 22 as a boundary, and furthermore, the inclined surfaces are fractionated into an inclined surface 23A (first inclined surface) in the second operation direction Y2, that is, on the upper side and an inclined surface 23B (second inclined surface) on the lower side with the convex part 24 as a boundary. Specifically, the wall to slide on 21 has a second valley part along the first operation direction Y1, that is, the substantially horizontal direction, at a position of the upper end of the convex part 24 that is the neutral position where the sliding pin 13 of the operation lever 10 in the unoperated state is located, and the upper inclined surface 23A and the lower inclined surface 23B are formed with the second valley part as a boundary. The upper inclined surface 23A and the lower inclined surface 23B are each formed so that a height thereof gradually increase with increasing distance from the second valley part. That is to say, the inclined surfaces 23A and 23B of the wall to slide on 21 in this example are formed so as to be, in the first operation direction Y1 that is the side-to-side direction as seen from the operator, inclined toward the tip of the operation lever 10 with decreasing distance to the valley part 22 extending in the vertical direction and, in the second operation direction Y2 that is the vertical direction as seen from the operator, inclined toward the tip of the operation lever 10 with decreasing distance to the second valley part extending in the side-to-side direction. As a result, the inclined surfaces 23A and 23B of the wall to slide on 21 are formed in a manner that, with a position that is the intersection of the valley part 22 and the second valley part and is the upper end position of the convex part 24 that is the neutral position of the sliding pin 13 as a center position, the heights gradually get higher than the center position with increasing distance from the center position.

The abovementioned upper inclined surface 23A is located at an upper position than the position of the upper end of the convex part 24, and becomes a surface on which the sliding pin 13 slides when the operation lever 10 is operated to move from the neutral position in the first operation direction Y1, that is, when the side-to-side turn signal operation is performed. Since the lower inclined surface 23B is located below the position of the upper end of the convex part 24, the lower inclined surface 23B becomes a surface to slide on at the time of stopping the blinking of the hazard lights after the operation lever 10 is operated to move from the neutral position in the second operation direction Y2, that is, after the hazard light operation. For example, the sliding pin 13 of the operation lever 10 is held located below the convex part 24 at the time of hazard light operation and, for stopping the blinking of the hazard lights from this state, the operator moves the knob 11 of the operation lever 10 in the first operation direction Y1, that is, leftward or rightward. Then, the position of the sliding pin 13 shifts in the substantially horizontal direction from the position below the convex part 24, and the sliding pin 13 gets located on the lower inclined surface 23B away from the valley part 22. At the time, since the sliding pin 13 slides and moves toward the second valley part along the slope of the lower inclined surface 23B because being pressed toward the tip, and moves so as to return to the neutral position.

Second Example Embodiment

Figure 6:
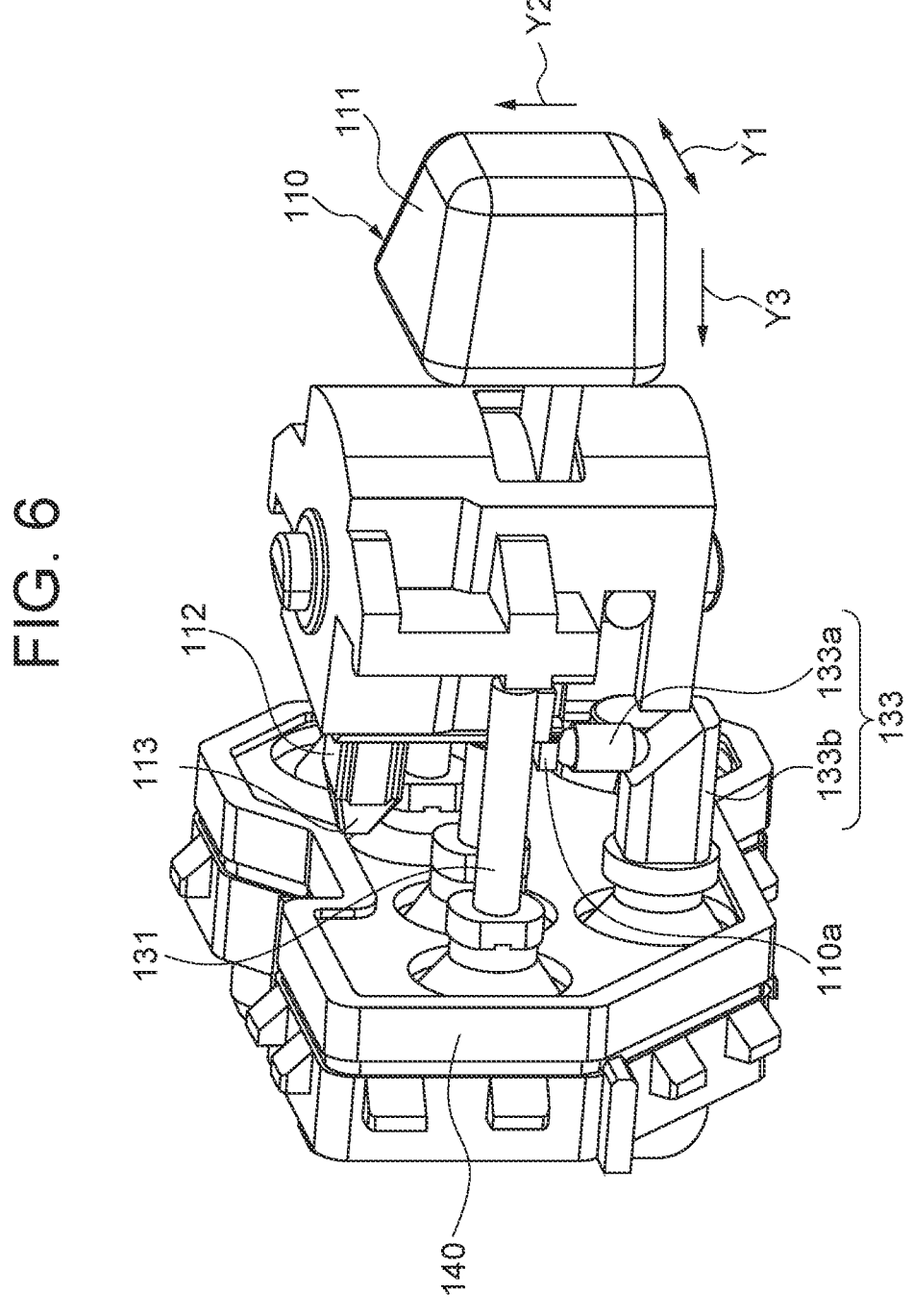
FIG. 6 is a figure showing a configuration of a turn signal switch in a second example embodiment of the present invention.

Next, a second example embodiment of the present invention will be described with reference to FIG. 6. FIG. 6 shows part of a configuration of a turn signal switch in this example embodiment.

The basic configuration of the turn signal switch in this example embodiment is the same as that in the first example embodiment. Specifically, as shown in FIG. 6, the turn signal switch in this example embodiment includes an operation lever 110 that has an operation knob 111 connected on one end of a lever part 112 having a predetermined length and a sliding pin 113 connected on the other end, that is, the tip of the lever part 112. Then, the turn signal switch includes a wall to slide on 21 on which the sliding pin 113 slides and on which a valley part 22 and inclined surfaces 23 (23A, 23B) as shown in FIG. 3 or 5 in the first example embodiment are formed, not illustrated in FIG. 6.

Consequently, in the same manner as described before, when the operator operates the knob 111 of the operation lever 110 to swing in the substantially horizontal direction that is first operation direction, the sliding pin 113 at the tip swings from a neutral position in the first operation direction Y1, that is, side-to-side direction, and thereafter, returns to the neutral position due to the inclination of the wall to slide on 21 shown in FIG. 3 or 5.

Further, the turn signal switch includes a turn signal contact mechanism 131 that detects turn signal operation of the operation lever 110, and is configured to detect the conduction and non-conduction states of a turn signal contact (first contact part) located at the tip of the turn signal contact mechanism 131, that is, the on-and-off states of the turn signal operation in accordance with the swing operation in the first operation direction Y1 of the operation lever 110. At the time, the turn signal contact is formed on a plate-like board 140 that is substantially perpendicular to the extending direction of the operation lever 110. An extension part 110a, which is a part of the operation lever 110 extended toward the board 140, abuts on a hazard light contact mechanism 133 to be described later.

Further, when the operator operates the knob 111 of the operation lever 110 upward in the substantially vertical direction that is a second operation direction, the sliding pin 113 at the tip moves from the neutral position shown in FIG. 3 or 5 downward along the valley part 22, and moves to a position below the convex part 24 over the convex part 24. After that, the sliding pin 113 of the operation lever 110 remains at the position below the convex part 24 that is a position in operation, and is held at the position.

Further, the turn signal switch includes a hazard light contact mechanism 133 that detects hazard light operation of the operation lever 110, and is configured to detect the conduction and non-conduction states of a hazard light contact (second contact part), that is, the on-and-off states of the hazard light operation, in accordance with the operation in the second operation direction Y2 of the operation lever 110. Specifically, the hazard light contact mechanism 133 includes a first transform part 133a that is pressed downward by the extension part 110a moved downward by the operation in the second operation direction Y2 of the operation lever 110, and a second transform part 133b that moves, with the downward movement of the first transform part 133a, in a direction in which the operation lever 110 extends, which is a direction toward the tip thereof, that is, the pushing direction Y3 of the operation lever 110. That is to say, the hazard light contact mechanism 133, which includes the first transform part 133a and the second transform part 133b, configures a transform mechanism that transforms the operation in the second operation direction Y2 of the operation lever 110 to an input in the pushing direction Y3. Then, the hazard light contact is formed at the tip in the pushing direction Y3 of the second transform part 133b. In particular, the hazard light contact is formed on the abovementioned board 140.

Thus, in this example embodiment, the turn signal contact that detects the turn signal operation and the hazard light contact that detects the hazard light operation are placed on the same board 140. For this reason, it is possible to simplify the configuration of the board 140 and the configuration of the turn signal switch.

SUPPLEMENTARY NOTES

The whole or part of the example embodiments disclosed above can be described as the following supplementary notes. The overview of a turn signal switch according to the present invention will be described below. However, the present invention is not limited to the following configurations.

Supplementary Note 1

A turn signal switch comprising:
an operation lever that can be operated to swing along a first operation direction, operated in a pushing operation direction, and operated in a second operation direction that is linear and different from both the first operation direction and the pushing operation direction; and
a contact part that switches between a conduction state and a non-conduction state in accordance with whether the operation lever is operated to swing along the first operation direction, operated in the pushing operation direction, or operated in the second operation direction, wherein the operation lever is configured to, after one end of the operation lever is operated to swing along the first operation direction or operated in the pushing operation direction, be returned to a neutral position at which the operation lever is held when not operated and, when the one end of the operation lever is operated in the second operation direction, be held at a position at time of the operation.

Supplementary Note 2

The turn signal switch according to Supplementary Note 1, wherein:

the operation lever has a sliding member provided at other end of the operation lever, and a biasing member that biases the sliding member in the pushing operation direction;

a member to slide on is included on which the sliding member can slide;

the member to slide on, which the sliding member abuts against, has a valley part provided along the second operation direction and an inclined surface extending in the first operation direction with the valley part as a boundary; and the valley part has a convex part protruding toward the operation lever.

Supplementary Note 3

The turn signal switch according to Supplementary Note 2, wherein:

the convex part is formed in a manner that the sliding member can climb over when the operation lever is operated along the second operation direction; and a distance from a position at which the sliding member abuts against the inclined surface to the valley part when the operation lever is operated to maximally swing in the first operation direction is more than a distance from a maximum protruding part of the convex part to the valley part.

Supplementary Note 4

The turn signal switch according to Supplementary Note 2, wherein a width along the first operation direction of the convex part is less than a width along the first operation direction of the member to slide on.

Supplementary Note 5

The turn signal switch according to Supplementary Note 3 or 4, wherein:

the operation lever is pivotally supported by a shaft part so as to be swingable in the first operation direction; and a second biasing member is included which applies force to make the other end of the operation lever move in the second operation direction to the operation lever.

Supplementary Note 6

The turn signal switch according to Supplementary Note 3 or 4, wherein:

the inclined surface is fractionated into a first inclined surface and a second inclined surface with the convex part as a boundary in the second operation direction;

the first inclined surface is a surface on which the sliding member slides when the operation lever is operated in the first operation direction; and the second inclined surface is provided in a manner that a height of the second inclined surface gradually increases with increasing distance from the first inclined surface in the second operation direction.

Supplementary Note 7

The turn signal switch according to Supplementary Note 3, further comprising a transform mechanism that transforms the operation in the second operation direction to an input in the pushing direction, wherein:

the contact part has a first contact part that becomes conductive when the operation lever is operated in the first operation direction, and a second contact part that becomes conductive when the operation lever is operated in the second operation direction; and the first contact part and the second contact part are placed on a same board.

Although the present invention has been described above with reference to the example embodiments, the present invention is not limited to the above example embodiments. The configuration and details of the present invention can be changed in various manners that can be understood by one skilled in the art within the scope of the present invention.

EXPLANATION OF REFERENCE NUMERALS

10 operation lever
11 knob
12 lever part
13 sliding pin
14 biasing member
20 support mechanism
20a shaft member
20aa first shaft part
20ab second shaft part
21 wall to slide on
22 valley part
23, 23A, 23B inclined surface
24 convex part
30 contact mechanism
31 moving part (turn signal contact mechanism)
32 detection part (turn signal contact mechanism)
33 hazard light contact mechanism
110 operation lever
110a extension part
111 knob
112 lever part
113 sliding pin
131 turn signal contact mechanism
133 hazard light contact mechanism
133a first transform part
133b second transform part
140 board

The invention claimed is:

1. A turn signal switch comprising:

an operation lever that can be operated to swing along a first operation direction, operated in a pushing operation direction, and operated in a second operation direction that is linear and different from both the first operation direction and the pushing operation direction; and a contact part that switches between a conduction state and a non-conduction state in accordance with whether the operation lever is operated to swing along the first operation direction, operated in the pushing operation direction, or operated in the second operation direction, wherein:

the operation lever is configured to, after one end of the operation lever is operated to swing along the first operation direction or operated in the pushing operation direction, be returned to a neutral position at which the operation lever is held when not operated and, when the one end of the operation lever is operated in the second operation direction, be held at a position at time of the operation;

the operation lever has a sliding member provided at other end of the operation lever, and a biasing member that biases the sliding member in the pushing operation direction;

a member to slide on is included on which the sliding member can slide;

the member to slide on, which the sliding member abuts against, has a valley part and an inclined surface extending in the first operation direction with the valley part as a boundary, wherein the valley part is provided along the second operation direction and is located in the middle of the member to slide on in a direction horizontal to the first operation direction;

the valley part has a convex part protruding toward the operation lever; and a width along the first operation direction of the convex part is less than a width along the first operation direction of the member to slide on.

2. The turn signal switch according to claim 1, wherein:

the operation lever is pivotally supported by a shaft part so as to be swingable in the first operation direction; and a second biasing member is included which applies force to make the other end of the operation lever move in the second operation direction to the operation lever.

3. A turn signal switch comprising:

an operation lever that can be operated to swing along a first operation direction, operated in a pushing operation direction, and operated in a second operation direction that is linear and different from both the first operation direction and the pushing operation direction; and a contact part that switches between a conduction state and a non-conduction state in accordance with whether the operation lever is operated to swing along the first operation direction, operated in the pushing operation direction, or operated in the second operation direction, wherein:

the operation lever is configured to, after one end of the operation lever is operated to swing along the first operation direction or operated in the pushing operation direction, be returned to a neutral position at which the operation lever is held when not operated and, when the one end of the operation lever is operated in the second operation direction, be held at a position at time of the operation;

the operation lever has a sliding member provided at other end of the operation lever, and a biasing member that biases the sliding member in the pushing operation direction;

a member to slide on is included on which the sliding member can slide;

the member to slide on, which the sliding member abuts against, has a valley part provided along the second operation direction and an inclined surface extending in the first operation direction with the valley part as a boundary;

the valley part has a convex part protruding toward the operation lever;

the convex part is formed in a manner that the sliding member can climb over when the operation lever is operated along the second operation direction;

a distance from a position at which the sliding member abuts against the inclined surface to the valley part when the operation lever is operated to maximally swing in the first operation direction is more than a distance from a maximum protruding part of the convex part to the valley part;

the inclined surface is fractionated into a first inclined surface and a second inclined surface with the convex part as a boundary in the second operation direction;

the first inclined surface is a surface on which the sliding member slides when the operation lever is operated in the first operation direction; and the second inclined surface is provided in a manner that a height of the second inclined surface gradually increases with increasing distance from the first inclined surface in the second operation direction.

4. A turn signal switch comprising:

an operation lever that can be operated to swing along a first operation direction, operated in a pushing operation direction, and operated in a second operation direction that is linear and different from both the first operation direction and the pushing operation direction; and a contact part that switches between a conduction state and a non-conduction state in accordance with whether the operation lever is operated to swing along the first operation direction, operated in the pushing operation direction, or operated in the second operation direction, wherein:

the operation lever is configured to, after one end of the operation lever is operated to swing along the first operation direction or operated in the pushing operation direction, be returned to a neutral position at which the operation lever is held when not operated and, when the one end of the operation lever is operated in the second operation direction, be held at a position at time of the operation;

the operation lever has a sliding member provided at other end of the operation lever, and a biasing member that biases the sliding member in the pushing operation direction;

a member to slide on is included on which the sliding member can slide;

the member to slide on, which the sliding member abuts against, has a valley part provided along the second operation direction and an inclined surface extending in the first operation direction with the valley part as a boundary;

the valley part has a convex part protruding toward the operation lever;

the convex part is formed in a manner that the sliding member can climb over when the operation lever is operated along the second operation direction;

a distance from a position at which the sliding member abuts against the inclined surface to the valley part when the operation lever is operated to maximally swing in the first operation direction is more than a distance from a maximum protruding part of the convex part to the valley part;

a transform mechanism that transforms the operation in the second operation direction to an input in the pushing direction;

the contact part has a first contact part that becomes conductive when the operation lever is operated in the first operation direction, and a second contact part that becomes conductive when the operation lever is operated in the second operation direction; and the first contact part and the second contact part are placed on a same board.

* * * * *